United States Patent [19]

Kiesow

[11] 3,904,296

[45] Sept. 9, 1975

[54] APPARATUS FOR DERIVING OXYGEN ASSOCIATION RATE CURVES FOR BLOOD SAMPLES

[75] Inventor: Lutz A. Kiesow, Bethesda, Md.

[73] Assignee: Baxter Laboratories, Inc., Morton Grove, Ill.

[22] Filed: Apr. 8, 1974

[21] Appl. No.: 459,226

Related U.S. Application Data

[63] Continuation-in-part of Ser. No. 351,014, April 13, 1973, Pat. No. 3,854,878.

[52] U.S. Cl. .................................. 356/246; 356/180

[51] Int. Cl.[2] .......................................... G01N 21/06

[58] Field of Search ........ 356/39, 41, 180, 181, 246

[56] References Cited

UNITED STATES PATENTS 3,779,708 12/1973 Runck et al. ........................ 356/41

*Primary Examiner*—Vincent P. McGraw
*Attorney, Agent, or Firm*—Herman L. Gordon; Richard G. Kinney

[57] ABSTRACT

An apparatus for deriving an oxygen association rate curve for a blood sample wherein the sample is introduced into a transparent-walled cell and is deoxygenated by contact with a deoxygenated fluorocarbon material. The cell is located in the optical path of two time-shared respective monochromatic beams, one having a wavelength at which there is substantially no change in absorbance as between oxygenated and deoxygenated blood and the other having a wavelength at which there is a relatively large change in absorbance as between oxygenated and deoxygenated blood. The difference in absorbance through the cell of the two wavelengths is measured and recorded while oxygenated fluorocarbon titrant material is pumped through the cell, the cell having a restricted flow passage for the titrant material which acts to separate the blood therefrom and retain it in the cell while the titration is taking place. The sample may be either injected directly into the cell or be exposed to the interior of the cell through gas-permeable capillary tubes extending into the cell in gas-transfer relationship with the interior of the cell, the tubes being transparent and being located in the optical path of the time-shared beams.

21 Claims, 9 Drawing Figures

DISCHARGE
FLUSHING LIQUID
FROM SYRINGE PUMP
TEMP. CONTROL LIQUID OUT
FILL
TEMPERATURE CONTROL LIQUID IN

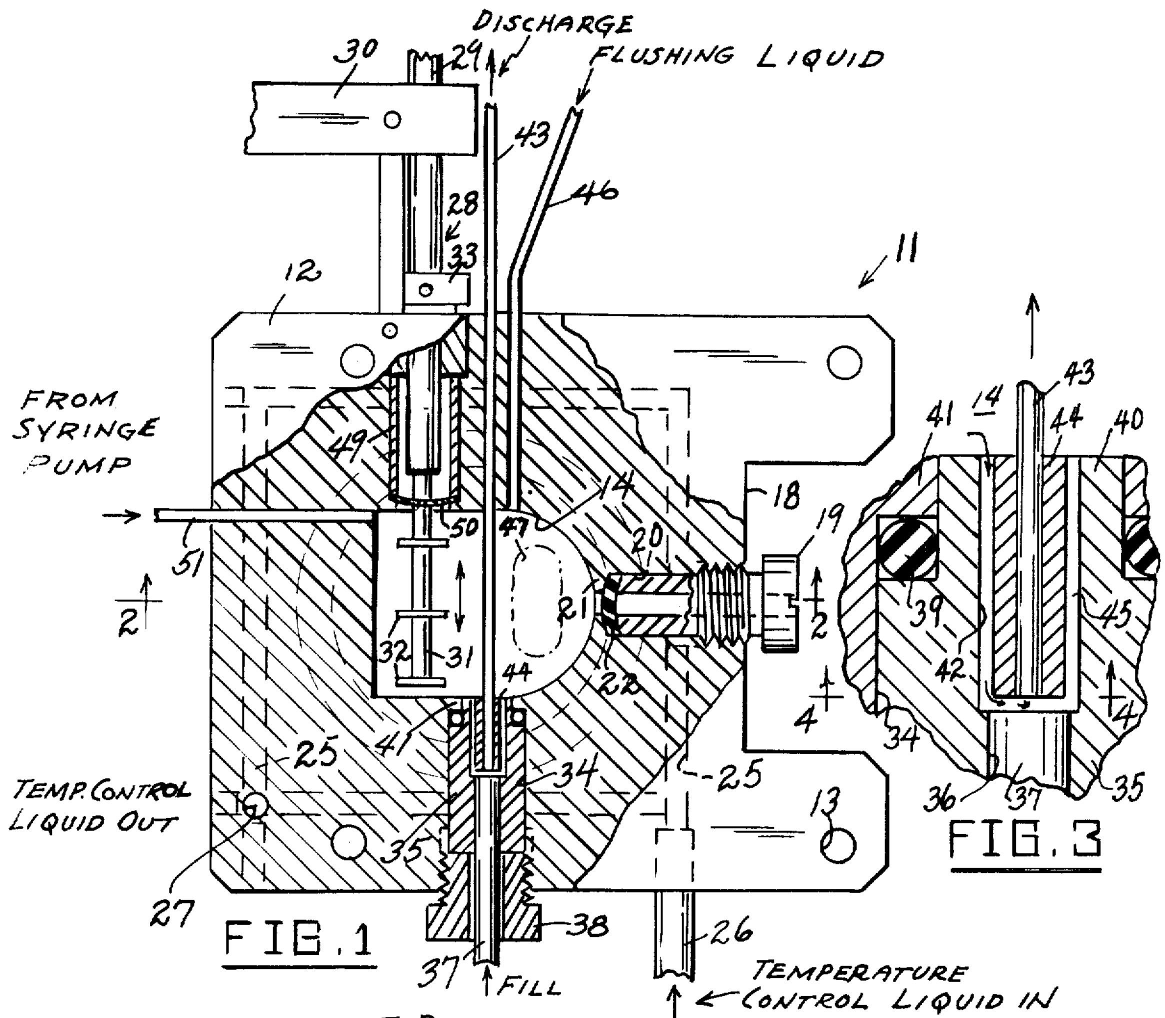
FIG.1
FIG.3
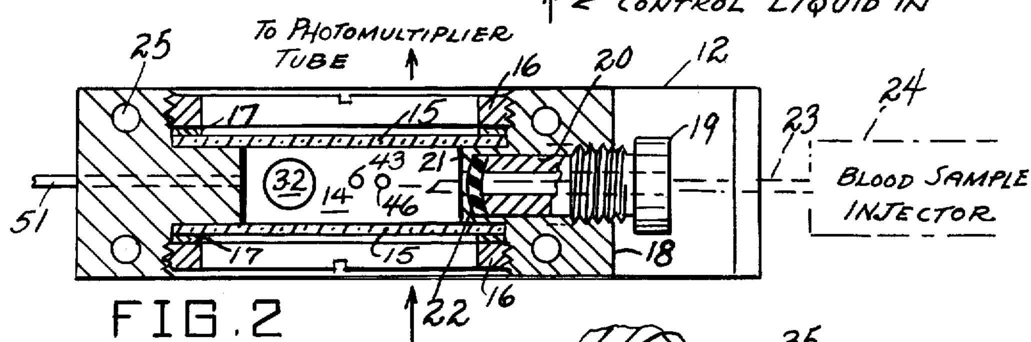
FIG.2
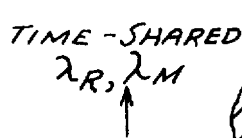
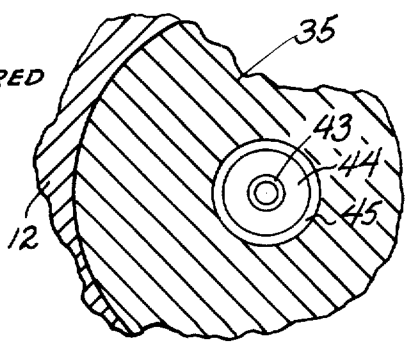
FIG.4

APPARATUS FOR DERIVING OXYGEN ASSOCIATION RATE CURVES FOR BLOOD SAMPLES

This application is a continuation-in-part of my previously filed application Ser. No. 351,014, filed Apr. 13, 1973, and now U.S. Pat. No. 3,854,878, and entitled "Method and Apparatus for Deriving Oxygen Association Rate Curves for Blood Samples."

This invention relates to methods and apparatus for measuring the oxygenation characteristics of blood or other material whose light-absorbing characteristics change while being treated with a reagent, and more particularly to a method and apparatus for deriving an oxygen association rate curve for a blood sample.

A main object of the invention is to provide a novel and improved technique for differentially studying the light absorbing properties of materials being treated with reagents which modify said light absorbing properties, and particularly for measuring the rate of oxygenation of a blood sample while it is being treated with an oxygenating reagent.

A further object of the invention is to provide an improved method and apparatus for measuring and recording the change in light absorbance of a blood sample being treated with an oxygenating reagent, the method involving relatively simple procedural steps and requiring only a small amount of the sample, and the apparatus being relatively inexpensive to construct and being easy to operate.

A still further object of the invention is to provide an improved absorbance cuvette or cell for use with a dual wavelength photometer apparatus for measuring the oxygenation characteristics of blood or similar material being treated with a reagent which changes the light-absorbing characteristics of the material.

A still further object of the invention is to provide an improved absorbance cell for use with a dual wavelength photometer or similar optical instrument for deriving oxygen association rate curve of a blood sample, the cell enabling a sample to be readily introduced therein and to be subsequently titrated with a liquid oxygenating material while time-shared beams of specific wavelengths are passed through the cell, enabling the differential absorbance of said wavelengths to be measured while the sample is being oxygenated, the cell enabling the titrant to be pumped through the cell while retaining the blood sample therein.

A still further object of the invention is to provide an improved absorbance cell for use with a dual wavelength photometer or similar optical instrument for deriving the oxygen association rate curve of a blood sample, the cell enabling a sample to be exposed to the interior of the cell through gas-permeable flow tubes extending into the cell in gas-transfer relationship with the interior of the cell.

Further objects and advantages of the invention will become apparent from the following description and claims, and from the accompanying drawings, wherein:

FIG. 1 is an elevational view, partly in vertical cross-section, of an improved absorbance-measuring cell adapted to be employed with a dual wavelength photometer in accordance with the present invention.

FIG. 2 is a horizontal cross-sectional view taken substantially on line 2—2 of FIG. 1.

FIG. 3 is an enlarged fragmentary vertical cross-sectional view taken through the phase separation, or blood retention, portion of the cell of FIGS. 1 and 2.

FIG. 4 is an enlarged fragmentary horizontal cross-sectional view taken substantially on the line 4—4 of FIG. 3.

Figure 9:
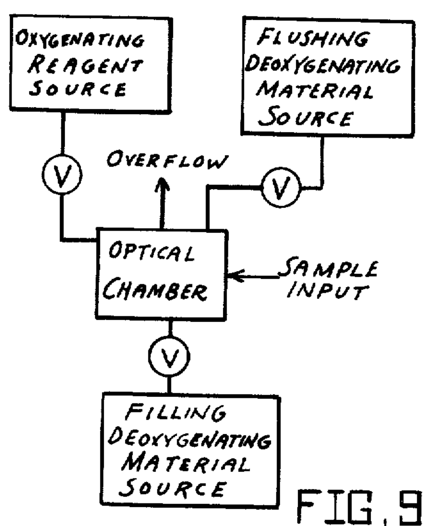
FIG. 9 is a schematic diagram showing an absorbance cell system according to the present invention, including the various sources of material to be furnished to the cell and schematically showing suitable valve means between the sources and the cell.

Reference is made to the previously filed patent application of George W. Lowy, Paul Priarone and Herbert M. Cullis, Ser. No. 291,046, filed Sept. 21, 1972, entitled "Dual Wavelength Photometer for Absorbance Difference Measurements," now issued as U.S. Pat. No. 3,787,124. This previously filed application discloses a dual wavelength photometer wherein time-shared monochromatic wavelengths $\lambda_R$ and $\lambda_M$, respectively 448 nm and 439 nm, are sequentially passed through a cuvette containing a blood sample being titrated by an oxygenating material, the beams impinging on a photomultiplier tube, and appropriate circuitry being provided to segregate the responses produced by the two wavelengths and to record the absorbance difference of the blood sample during the course of the oxygenating titration. As is pointed out in said previously filed application, the reference wavelength $\lambda_R$, namely 448 nm, is of a value such that there is substantially no change in absorbance as between oxygenated and deoxygenated blood, whereas the measure wavelength, namely, 439 nm, is of a value at which there is relatively large change in absorbance as between oxygenated and deoxygenated blood. The instrument thus plots the difference in absorbance for the two wavelengths with time as the sample is being oxygenated.

In the apparatus disclosed in said previously filed application, oxygen is generated at a constant rate in an optical cell containing a blood sample in the liquid phase, employing a dilute hydrogen peroxide solution of known concentration as titrant and catalase as a decomposition catalyst. Oxygen is thereby generated stoichiometrically at a rate which is proportional to the rate of the controlled titrant flow into the cuvette.

Improved results can be obtained by employing a liquid perfluorinated carbon compound as the titrant, for example, Mediflor FC–43, FC–47 or FC–80, manufactured by the 3M Company, Inc. Minneapolis, Minn., which are fluorocarbon materials which can be readily deoxygenated and oxygenated, and which can be efficiently used as deoxygenating and oxygenating reagents for blood samples. One of the objectives of the present invention therefore is to provide a cuvette wherein this type of titrant can be satisfactorily employed and which can be incorporated for use in a dual wavelength photometer of the type described in said previously filed application, or in other absorbance-measuring instruments.

Referring now to the drawings, 11 generally designates an improved titration cell for use in an oxygen association rate curve-deriving technique according to the present invention. The typical titration cell 11 comprises a metal block 12 of generally rectangular shape provided with a plurality of mounting apertures 13. The block is formed with a central cavity 14 and is provided on opposite sides of the cavity with transparent parallel circular window discs 15, 15 clampingly secured in circular recesses provided therefor by retaining rings 16, 16 threadedly engaged in the circular recesses. Flat annular sealing gaskets 17, 17 are provided between the clamping rings 16 and the transparent window discs 15.

The block 12 is formed at one side thereof with a large rectangular notch 18, and a flanged injection guide conduit member 19 is threadedly engaged in a bore 20 extending from the midportion of the notch 18 toward the cavity 14. The inner end of the bore 20 adjacent cavity 14 is reduced to define an annular retaining seat 21 against which a rubber septum disc 22 is clamped by the inner end of conduit member 19. The septum disc 22 is penetrable by the hollow needle 23 of a hypodermic syringe 24 employed to inject a blood sample into cavity 14, as will be presently described.

The block 12 is formed with drilled passages 25 extending around cavity 14 and appropriately plugged at ends thereof to define a means for circulating temperature-controlling liquid so as to maintain the temperature of the block at a controlled value. The temperature-control liquid is admitted to the passages through an inlet conduit 26, and the liquid leaves the block through an outlet passage 27, whereby the liquid can circulate through the passage 25 and thereby maintain a constant temperature in the cavity 14.

As will be presently explained, it is desirable to agitate the contents of cavity 14, and therefore an agitating mechanism 28 is provided on the top portion of block 12, said mechanism being driven by a rotary shaft 29 journalled in a bearing bar 30 suitably secured to the main block 12. The shaft 20 reciprocates an agitator rod 31 extending into cavity 14, said rod having spaced agitating flanges 32. The mechanism 28 is provided with a conventional motion-converting assembly 33 between rod 31 and shaft 29 which converts the rotary movement of the shaft into reciprocating axial movement of rod 31.

The agitator rod 31 extends into cavity 14 through a housing sleeve 49 mounted in the upper portion of block 12 and provided at its bottom end with a flexible cover diaphragm 50, the rod being sealingly secured to and extending through the center portion of said diaphragm.

Block 12 is formed with a counterbored bottom filling passage 34 in which is seated a sleeve member 35 having a lower central bore portion 36 in which is secured the end of a filling tube 37. A screw bushing 38 surrounds tube 37 and is threadedly engaged with the block 12 below sleeve member 35 and clamps said sleeve member against a resilient deformable O-ring 39 engaged around the reduced top neck portion 40 of sleeve member 38, the O-ring 39 being thus forced against the annular seat 41 defined at the top end of counterbored passage 34.

Sleeve member 35 has an enlarged vertical bore portion 42 communicating with cavity 14. A vertical outlet tube 43 extends through the top portion of block 12 in alignment with bore portion 42 and is provided at its lower end with an elongated collar member 44, said tube lower end and collar member extending downwardly into bore portion 42 in the manner shown in FIG. 3 and defining a generally cylindrical constricted passage 45 between cavity 14 and the lower end of outlet tube 43. The spacing between the exterior surface of collar member 44 and bore portion 42 is of the order of 0.005 inch and the height of the collar member in said bore portion is substantial, being of the order of at least one-half inch, so that the constriction 45 has substantial axial length. As will be presently explained, the axial length of said constriction is sufficient to enable blood to separate from reagent liquid flowing from cavity 14 downwardly into bore portion 42 toward the bottom end of outlet tube 43 while the mixture in cavity 14 is being agitated by the action of rod 31.

A flushing tube 46 is secured in the top portion of block 12 in communication with the top of cavity 14 for a purpose presently to be described.

A titrant admission tube 51 extending to and communicating with the upper corner portion of cavity 14 opposite conduit member 9 is secured in block 12. Tube 51 is connected to a suitable syringe pump containing oxygenated fluorocarbon material, such as Mediflor FC-43, or the like, as above identified.

Input shaft 29 of agitator driving mechanism 28 is connected to a suitable driving means, such as an electric motor or the like, not shown.

The cell 11 is mounted in the optical path of the associated dual wavelength photometer so that the time-shared $\lambda_R$ and $\lambda_M$ light beams pass transversely through the windows 15 and substantially through an area shown in dotted view at 47.

In operating the apparatus, a quantity of fluorocarbon liquid material, such as Mediflor FC-43, or the like, is first deoxygenated by external conventional means, such as degassing with nitrogen or other inert gas, and is inserted into cavity 14 through filling tube 37, completely filling the cavity, overflow taking place through the exit tube 43.

With the cell 11 mounted in the photometer, a blood sample (typically partially oxygenated) is then injected into the cavity 14 through the conduit member 19 by means of a hypodermic syringe, as illustrated in dotted view in FIG. 2.

The agitator mechanism 28 is activated and remains in operation throughout the remaining procedure.

At this stage, deoxidation of the injected blood sample takes place by contact with the fluorocarbon liquid and because of dilution. Complete deoxidation of the blood sample is then performed by flushing the cavity 14 with deoxygenated fluorocarbon material admitted into the cavity through the flushing tube 46.

The optical system is then balanced by employing a procedure similar to that described in previously filed application Ser. No. 291,046, above identified, and the electronic system thereof is activated so that the instrument begins to record.

Externally oxygenated fluorocarbon material (Mediflor FC-43, or the like) is then pumped into the cavity 14 through tube 51, which begins the titration process. In this step, and in the previously described flushing (deoxidation of the blood sample) step, excess fluorocarbon material leaves the cell through the "phase separator" restriction 45 and tube 43, the blood being retained because the blood floats back up into cavity 14 while the relatively less bouyant fluorocarbon material passes through the restriction 45 and is flushed out through tube 43. The optical measurements are made during this stage of the procedure and an oxygen association rate curve is recorded in a manner similar to that described in the previously filed application Ser. No. 291,046.

Figure 5:
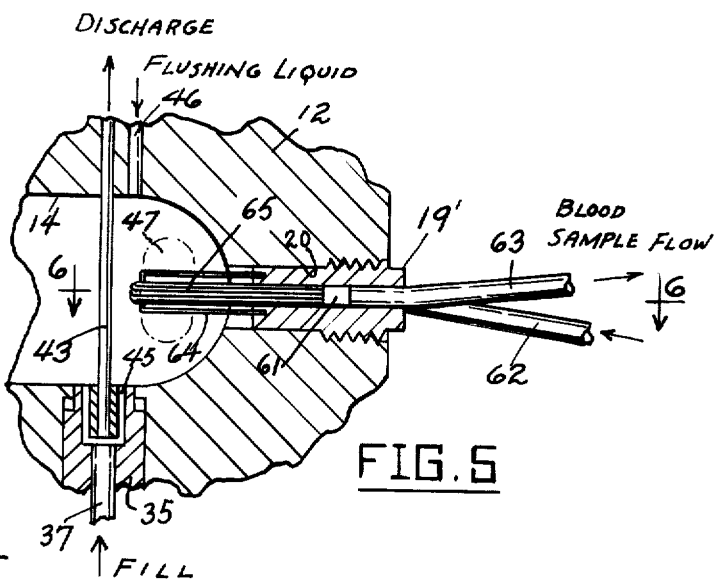
FIG. 5 is a fragmentary vertical cross-sectional view taken substantially on the line 5—5 of FIG. 6, showing a modification of an absorbance measuring cell according to the present invention wherein a sample is introduced into the cell by passing it through gas-permeable tubes exposed to the interior of the cell.
Figure 6:
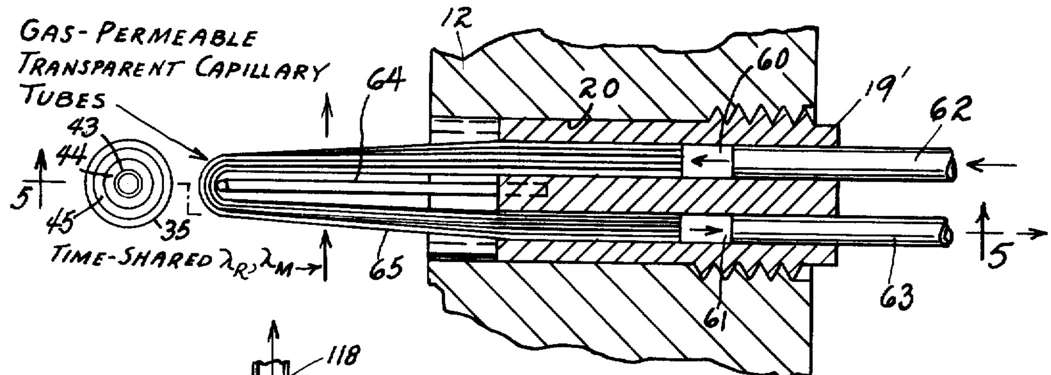
FIG. 6 is an enlarged horizontal cross-sectional view taken substantially on line 6—6 of FIG. 5.

Referring now to the form of the invention shown in FIGS. 5 and 6, in place of the previously described injection guide conduit member 19, a plug 19' is threadedly engaged in the bore 20. The plug member 19' has parallel longitudinally extending bores 60 and 61 in which are respectively sealingly secured the ends of a blood sample inlet conduit 62 and a blood sample outlet conduit 63. A longitudinally inwardly projecting U-shaped support member 64 of rigid rod material in rigidly secured to the inner end of plug member 19' with its plane transverse to the plane of bores 60 and 61. A U-shaped bundle of transparent capillary tubes 65 has its ends sealingly secured in the inner end portions of the bores 60 and 61 with its bight portion supportingly engaged on the bight portion of the U-shaped rigid supporting member 64. The capillary tubes are made of a material which is gas-permeable, such as methyl silicone-polycarbonate copolymer, and the tubes have an inside diameter of the order of 25 microns. This is sufficient to freely pass blood, since the blood cells have a maximum dimension of the order of 7 microns.

Thus, in the embodiment shown in FIGS. 5 and 6, the blood sample flows through the transparent capillary tubes 65 and is thereby introduced into the chamber 14 in gas-transfer relationship with the interior of the chamber. The capillary tubes containing the blood sample are mounted so that their inner portions adjacent the bight portion of the bundle are located in the optical path of the time-shared $\lambda_R$ and $\lambda_M$ light beams passing transversely through the windows 15 and through the area 47 in the manner shown in FIG. 5. The bundle of capillary tubes may be arranged so that the light beams pass successively through the outlet and inlet capillary tube legs, namely, with the plane of the bundle aligned with the optical path of the light beams, as illustrated in FIG. 6, and with the plane of the U-shaped support member 64 transverse to the optical path, as shown in FIG. 5.

The procedure employed with the embodiment of FIGS. 5 and 6 is generally similar to that of the previously described embodiment, namely, first inserting deoxygenated fluorocarbon material into cavity 14 through filling tube 37, overflow taking place through exit tube 43. The blood sample is then allowed to flow through the capillary tube bundle 65 and the agitator mechanism is activated. Deoxygenation of the sample takes place by gas-transfer contact with the flurorcarbon liquid. Complete deoxygenation may be achieved by flushing cavity 14 with deoxygenated fluorocarbon material admitted through flushing tube 46. The optical system may then be activated as above described and externally oxygenated fluorocarbon material may then be pumped into cavity 14 through the tube 51 (as in FIG. 1), which begins the titration process. Excess fluorocarbon material leaves the cell through the phase separator restriction 45 located at the bottom of the chamber 14, and through the tube 43. The optical measurements are made during this stage of the procedure and an oxygen association rate curve is recorded in the manner previously described.

Figure 7:
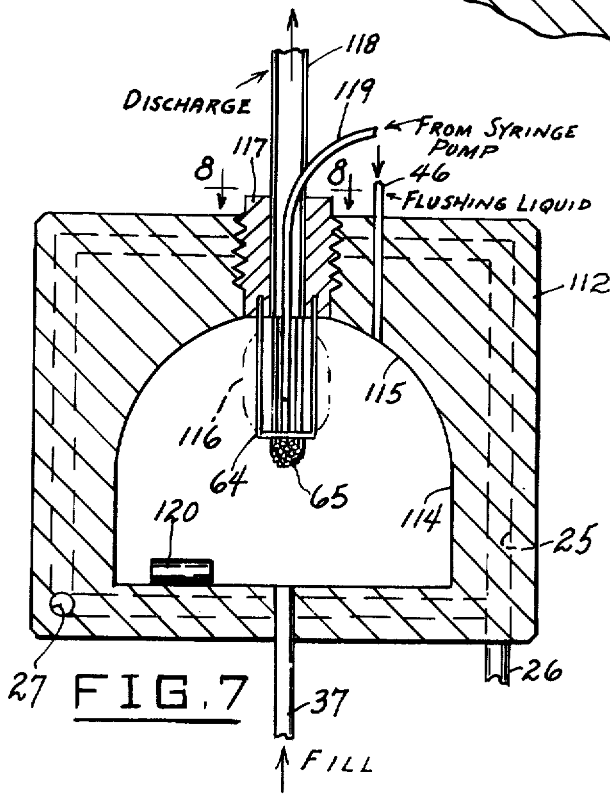
FIG. 7 is a vertical cross-sectional view taken through another modification of a cell also employing gas-permeable tubes exposed to the interior of the cell.
Figure 8:
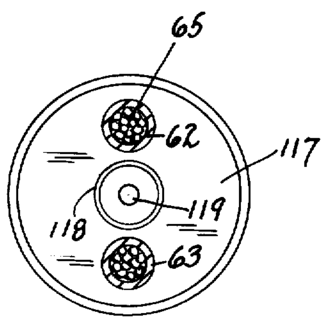
FIG. 8 is an enlarged horizontal cross-sectional view taken substantially on the line 8—8 of FIG. 7.

FIGS. 7 and 8 illustrate a further modification of the present invention employing an arrangement somewhat similar to that of FIGS. 5 and 6 but with the capillary tube bundle 65 arranged vertically. In this modification, the cell comprises a metal block 112 formed with a cavity 114 having a rounded top wall portion 115 and provided with transparent opposite windows, as in the embodiments of FIGS. 1 to 6, with an optical inspection system wherein the time-shared $\lambda_R$ and $\lambda_M$ light beams pass tranversely through the windows and through an area shown in dotted view at 116. A vertical plug member 117 is threadedly engaged through the top wall of the cell, said plug member being provided at its bottom end with a depending U-shaped rigid support member 64. The plug member is provided with parallel longitudinal bores similar to those described in connection with FIGS. 5 and 6, with the end portions of a U-shaped bundle 65 of transparent gas-permeable capillary tubes sealingly secured in the lower portions of the bores and engaged transversely around the bight portion of the U-shaped rigid support member 64, the bundle 65 being oriented in the same manner relative to the optical path of the time-shared light beams as previously described in connection with the embodiment of FIGS. 5 and 6. A filling tube 37 for deoxygenated fluorocarbon material is connected to the bottom portion of the cell, as shown. A discharge overflow tube 118 is coaxially sealingly secured in plug member 117. A flushing liquid tube 46 extends through the top wall of cavity 114 for discharging deoxygenated fluorocarbon material into the top portion of said cavity. A tube 119 for admitting externally oxygenated fluorocarbon material is coaxially secured in overflow tube 118 and extends downwardly between the legs of the capillary tube bundle 65, terminating near the bight portion of the bundle, as shown in FIG. 7.

An externally driven magnetic stirrer element 120 is provided in the lower portion of the cell, being rotated by conventional external drive means.

Suitable inlet and outlet blood sample tubes 62 and 63 are connected to the bores of plug member 117 in communication with the respective side leg portions of the capillary tube bundle 65, as in the embodiment of FIGS. 5 and 6.

The operation of the embodiment of FIGS. 7 and 8 is generally similar to that of FIGS. 5 and 6.

While certain specific embodiments of apparatus for deriving an oxygen association rate curve for a blood sample have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An absorbance cell system for use in a photometer comprising a chamber having opposite transparent wall portions arranged for transmitting light beams through the chamber, means to introduce a sample into the chamber in gas-transfer relationship with the interior of the chamber, a source of deoxygenating liquid material, controlled conduit means connecting said deoxygenating material source to said chamber, overflow conduit means communicating with said chamber, a source of liquid oxygenating reagent, and controlled conduit means connecting said last-named source to said chamber.

2. The absorbance cell system of claim 1, and wherein said overflow conduit means includes a restriction sufficient to separate the sample from the overflow liquid leaving the chamber through said overflow conduit means.

3. The absorbance cell system of claim 2, and wherein said overflow conduit means comprise an overflow conduit extending downwardly to the bottom of said chamber, said chamber bottom having a recess receiving the bottom end portion of said overflow conduit, said restriction comprising the space between the wall of the recess and said overflow conduit bottom end portion.

4. The absorbance cell system of claim 3, and wherein said space is of the order of 0.005 inch in width.

5. The absorbance cell system of claim 4, and wherein the means to introduce the sample into the chamber in gas-transfer relationship with the interior of the chamber comprises means to inject the sample into the chamber.

6. The absorbance cell system of claim 1, and wherein the means to introduce the sample into the chamber in gas-transfer relationship with the interior of the chamber comprises transparent gas-permeable conduit means extending into the chamber and being located in the optical path between said transparent wall portions.

7. The absorbance cell system of claim 6, and wherein said gas-permeable conduit means comprises a bundle of gas-permeable transparent capillary tubes.

8. The absorbance cell system of claim 7, and wherein said bundle of gas-permeable transparent capillary tubes is generally U-shaped.

9. The absorbance cell system of claim 8, and means to support said U-shaped bundle in a position with its plane substantially aligned with the optical path between said transparent wall portions.

10. The absorbance cell system of claim 9, and wherein said supporting means comprises U-shaped rigid member rigidly secured to the chamber and extending through the bundle with its bright portion inwardly adjacent that of the bundle.

11. The absorbance cell system of claim 10, and wherein said U-shaped rigid member is in a plane substantially transverse to the plane of the bundle.

12. The absorbance cell system of claim 1, and wherein the means to introduce the sample into the chamber in gas-transfer relationship with the interior of the chamber comprises transparent gas-permeable conduit means extending into the chamber and located in the optical path between said transparent wall portions, said overflow conduit means being substantially coaxial with said gas-permeable conduit means.

13. The absorbance cell system of claim 12, and wherein said conduit means connecting said oxygenating reagent source to said chamber is substantially coaxial with said overflow conduit means.

14. The absorbance cell system of claim 13, and wherein said gas-permeable conduit means comprises a substantially U-shaped bundle of transparent gas-permeable capillary tubes.

15. The absorbance cell system of claim 14, and means to support said U-shaped bundle in a plane substantially aligned with the optical path between said opposite transparent wall portions of the chamber.

16. The absorbance cell system of claim 1, and wherein the deoxygenating material and the oxygenating reagent comprise fluorocarbon materials.

17. An absorbance cell for use in a photometer comprising a chamber having transparent wall portions arranged for transmitting light beams through the chamber, means to inject a sample into the chamber, inlet conduit means connected between said chamber and a supply of reagent, and overflow conduit means connected to the chamber and including a restriction sufficient to separate the sample from overflow reagent leaving the chamber through said overflow conduit means.

18. The abosrbance cell of claim 17, and further conduit means connected to the chamber for at times filling the chamber with a deoxydizing reagent.

19. The absorbance cell of claim 17, and wherein said overflow conduit means comprises an overflow conduit extending downwardly to the bottom of said chamber, said chamber bottom having a recess receiving the bottom end portion of said overflow conduit, said restriction comprising the space between the wall of the recess and said overflow conduit bottom end portion.

20. The absorbance cell of claim 19, and wherein said space is of the order of 0.005 inch in width.

21. The absorbance cell of claim 18, and flushing conduit means connected to the chamber for flushing the chamber with deoxidizing reagent.

* * * * *